United States Patent Office 3,795,607
Patented Mar. 5, 1974

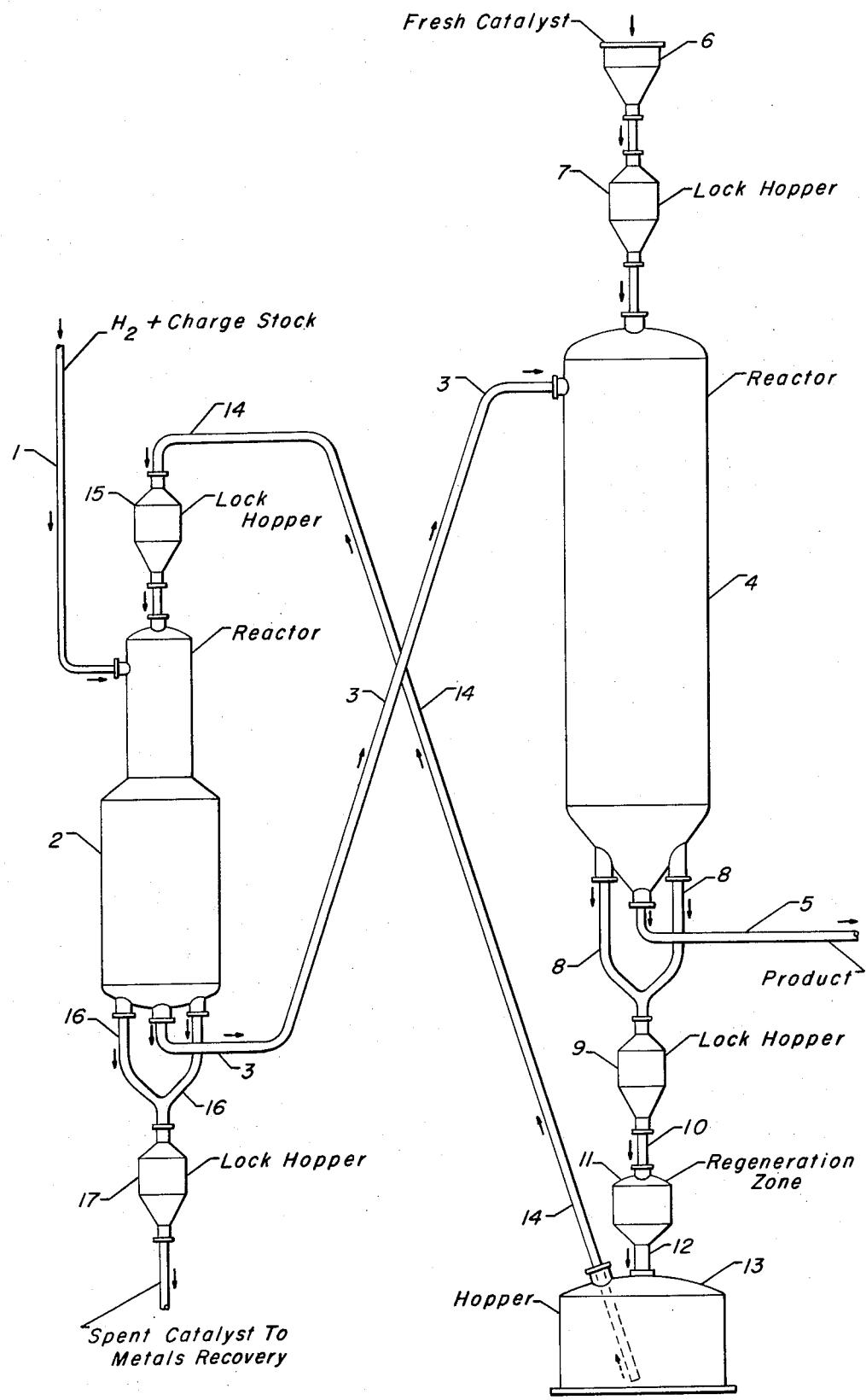

3,795,607
METAL, SULFUR AND NITROGEN REMOVED FROM HYDROCARBONS UTILIZING MOVING BED REACTORS
Frank H. Adams and Robert F. Anderson, La Grange Park, Ill., assignors to Universal Oil Products Company, Des Plaines, Ill.
Filed Aug. 23, 1972, Ser. No. 282,999
Int. Cl. C10g 23/08
U.S. Cl. 208—210        27 Claims

ABSTRACT OF THE DISCLOSURE

Hydroprocessing of hydrocarbon charge stocks which contain sulfur and various metals is performed using two moving bed reactors connected in series; intermittently fresh catalyst is added to and used catalyst is removed from the second reactor, the used catalyst is regenerated and charged to the first reactor for use in metals removal and initial hydrotreating of the charge stock.

BACKGROUND OF THE INVENTION

Field of the invention

The invention pertains to the hydrotreating and hydrorefining of hydrocarbons to remove metals, sulfur, and nitrogen and to the hydrocracking of hydrocarbons. Optimal usage of a catalyst being fouled by metals deposition is achieved through continuous operation of moving bed reactors with transfer of regenerated catalyst between reactors before it is discarded. Regeneration of the catalyst is accomplished by burning off carbon, followed by optional reduction and sulfiding of the base metal on the catalyst prior to use.

Description of the prior art

Processing hydrocarbons by passage with hydrogen over beds of catalyst is described in detail in the prior art. Specific examples are U.S. Pat. No. 2,767,121 which teaches the manner in which a naphtha boiling range charge stock is treated for sulfur and nitrogen removal and to saturate olefins in the preparation of charge stock for a catalytic reforming unit. In U.S. Pat. No. 2,717,857 a process for desulfurization of gas oil fractions (material boiling over 400° F., the normal endpoint for gasoline) is discussed. Heavy oil hydrotreating processes and techniques are also described in U.S. Pats. 3,501,396, 3,471,- 397, 3,371,029, 3,375,189 and 3,429,801. A catalyst especially useful for the hydrorefining of heavy residual oil is described, along with a process using the catalyst, in U.S. Pat. No. 3,525,684.

Processes for the purposes outlined above have traditionally been performed using a fixed bed of catalyst contained in one or more reaction vessels. This procedure has two inherent disadvantages to operation which it is the object of this invention to remove. As the catalyst in a fixed bed system is used, its activity gradually decreases and results in a continued lessening in the quality of the product unless the reaction conditions are modified. Second, when it is no longer possible to maintain adequate product quality, the catalytic material must be replaced while processing is switched to another "swing" reactor or while the process is not operating. The catalytic desulfurization of residual fuel oils is hindered by fouling of the catalyst by coke, metals removed from the oil, salt scale and other plant trash. In addition to reducing the activity of the catalyst, deposits of such material increase the pressure drop in the reactor resulting in higher operating expenses and interfere with the uniform distribution of hydrogen and oil across the catalyst, thereby causing channelling, hot spots and further catalyst deactivation. Shutdowns due to these problems are very costly due to the loss of production and catalyst replacement expense. A technique resorted to in the prior art to avoid this problem is the use of guard reactors prior to the main desulfurization reactor. These reactors are used on a "swing" basis, meaning only one is in the process flow at any time while the other is being regenerated or refilled with new catalyst. In the processing of crude oils containing a high concentration of metals, the deactivation of the catalyst due to the metal content of the oil is as serious a problem as deactivation due to carbon deposition on the catalyst even though it may occur at a slower rate. The regeneration of the catalyst by burning off the carbon does not result in a full restoration of the catalytic activity of the catalyst since the metals are not removed. It is an object of this invention to provide a means whereby hydrotreating of a metal containing residual crude oil can be performed on a continuous basis, with catalyst being circulated from a second reaction zone to a first reaction zone and then discarded when completely spent. In this manner, metals removed in the guard reactor and particulate material filtered out in the guard reactor are not admitted to the main, second, reaction zone.

SUMMARY OF THE INVENTION

Hydrotreating is accomplished in a two reactor moving bed system using series flow of the charge stock and two step reverse series flow of the catalyst between reactors to provide initial metals removal and clean up of the charge stock in the first reactor containing the regenerated used catalyst and the remainder of the hydrotreating in the second reactor containing the fresh catalyst. The process comprises the steps of passing the hydrocarbon charge stock and hydrogen through the first moving bed reaction zone containing regenerated catalyst, passing the effluent from the first reaction zone through the second reaction zone containing fresh catalyst, while intermittently removing used catalyst from the bottom of the second reaction zone, separating this used catalyst from the effluent of said second reaction zone, contacting the used catalyst with an oxygen containing gas to burn off accumulated carbon deposits to thereby regenerate the catalyst, and passing said regenerated catalyst into the first reaction zone from which spent catalyst is sent to a metals recovery unit.

DESCRIPTION OF THE DRAWING

Hydrocarbon charge stock and hydrogen enter the process through line 1 located at the top of first reactor 2 and pass downward through the reactor to exit by line 3 and transfer into the second reactor 4. Hydrotreated products leave the process by line 5 for passage to a high pressure separator or other processing as may be appropriate. Fresh catalyst is fed to the system through line 6 by means of lock hopper 7 used to equalize pressure on the catalyst before admission to second reactor 4. This catalyst gradually travels downward through the reactor and, as used catalyst, is removed from the bottom of the reactor through means 8 and fed into lock hopper 9. The separated catalytic material is then transported through line 10 into regeneration zone 11 located in a second lock hopper wherein the catalyst is contacted with an oxygen-containing gas such as air which enters by means not shown. After suitable carbon removal by oxidation has occurred in the regeneration zone, catalytic material is first passed by line 12 into hopper 13 and then pressurized through line 14 to the lock hopper 15 located at the top of the first reactor. Catalyst added to the first reactor 2 through lock hopper 15 flows downward through the reactor wherein initial metals removal from the charge stock is performed and extraneous particulate matter is removed. Spent catalyst is removed through means 16 and enters lock hopper 17 for removal from the reactor system and passage to a metals recovery unit. For the purpose of clarity and simplicity, controls, valves, heat exchangers, and other equipment obviously necessary have not been shown. The drawing and this description of the drawing are not intended to in any way limit the manner in which the process may be utilized. The regeneration zone may comprise a fluidized bed, a moving bed similar to the reaction zone, or a fixed bed as previously indicated. Additional steps such as reduction and sulfiding of the catalyst prior to its return to a reaction zone are within the scope of this invention. Reduction and sulfiding can be conducted in the transfer line 14 or in lock hopper 15 or within the second reaction vessel itself.

DETAILED DESCRIPTION OF THE INVENTION

The broad field of hydroprocessing is divided into three main subdivisions. The first is hydrotreating wherein materials such as sulfur, nitrogen, and metals contained in various organic molecular structures are removed from the charge stock with very little molecular cracking. The second subdivision is hydrocracking, wherein at least 50% of the charge stock is cracked into smaller molecular weight components, such as the production of a naphtha from a heavy distillate. Hydrorefining is between these two extremes and results in molecular changes to up to 10% of the feed together with impurity removal. Although there are many differences in processing conditions or suitable catalysts and flow schemes for these two different operations, they are basically alike in most aspects.

The catalysts used in these processes are typically composed of a base metal, which is defined to be a metal selected from the group comprising nickel, iron, and cobalt, supported on an inorganic oxide carrier. The manufacture and composition of these catalysts is an art in itself and is not directly relevant to the practice of the process of this invention. A typical catalyst may contain from about 0.1 to 10% nickel or other metal or a combination of metals from the base metal group, along with other metals such as molybdenum or vanadium. The base material of the catalyst will normally be a refractory inorganic oxide such as alumina, silica, zirconia, boria, etc. or combinations of any of these materials, particularly, alumina in combination with one or more of the other oxides. The alumina is usually in excess with a weight ratio of alumina to other components of from 1.5:1 to about 9:1 and preferably from about 1.5:1 to about 3:1. The inclusion of a small amount of silica is very common to increase the overall cracking activity of the catalyst since silica itself is an effective cracking catalyst even though used as a support for the metals. Details of production of suitable catalysts are given in U.S. Pat. No. 3,525,684.

Processing conditions for any hydrorefining operation are determined by the charge stock, the catalyst used and the desired result of the process. A broad range of conditions include a temperature of from 500° F. to 1000° F., a pressure of from 300 p.s.i.g. to 4000 p.s.i.g., and a liquid hourly space velocity of 0.5 to about 5.0. The liquid hourly space velocity is defined as the volume of the liquid charged to the reactor divided by the volume of the catalyst in the reactor. The exact reactor temperature required is determined by the activity and age of the catalyst. As a general rule, the operating pressure will be increased with the boiling point of the material being processed. In all hydrotreating operations, hydrogen is circulated through the process at a rate of from about 1000 to about 25,000 standard cubic feet per barrel of charge. This is to increase vaporization and thereby improve processing results, to provide hydrogen for the formation of ammonia and hydrogen sulfide from the nitrogen and sulfur removed from the charge stock, and for the saturation of olefinic hydrocarbons and cracking of large molecules. The production of hydrogen sulfide and ammonia makes it necessary to in some manner remove these compounds from the process on a continuous basis. Normal procedure to accomplish this is the injection of water into the reactor effluent to dissolve the salts of these impurities followed by cooling sufficient to form a water phase which is decanted from a separatory vessel. A second method is the treatment of the hydrogen recycle stream with a caustic solution to scrub out the $H_2S$. The performance of these and other suitable operations is well known to those skilled in the art and warrants no further explanation.

In the processing of residual fractions of crude petroleum, it is common that metals, most commonly nickel and vanadium, will be present in this fraction at concentrations exceeding 100 p.p.m. by weight. These metals are an impurity that must be removed prior to further processing or use of the crude oil. This is commonly done in the same process in which the sulfur and nitrogen are removed by hydrocracking the large metal containing and usually thermally stable molecules to break free the individual metal atoms. The metal released in this manner accumulates on the catalyst and will cause its eventual deactivation, and during a cycle of catalyst use can be as serious a problem as the deactivation caused by carbon disposition on the catalyst due to coking of the charged hydrocarbon material. Metals deposited on the catalyst in this manner are not removed by the burning off of the built up carbon layers making it impossible to regenerate the used catalyst to an activity equal to that of unused catalyst. Eventually replacement of used catalyst is a very time consuming procedure which the present invention eliminates.

Catalysts are also fouled by salt, scale, plant trash and particulate impurities contained in the residual fuel oil. It is therefore apparent that the initial catalyst acts not only as a catalyst but also as a filter medium for the charged material. This phenomenon causes interference with the uniform distribution of hydrogen and oil across the catalyst bed resulting in channelling of reactant flow, hot spots, and further catalyst deactivation. An increased pressure drop through the reactor which increases the expense of operation is also an undesirable result of this filter action. Shutdowns due to these problems are very costly in both downtime and catalyst replacement expense. A technique for overcoming these disadvantages of the fixed bed methods used in the prior art is a direct object of this invention.

The flow utilized in the present invention is series flow of the charge stock through two reactors with catalyst movement in a two step semi-countercurrent fashion wherein the fresh charge stock is first contacted with regenerated used catalyst. Catalyst movement is by gravity and therefore confined to a downward flow. Full countercurrent flow of the reactants in a liquid phase is seldom used in hydroprocessing of heavy oils because of the poor conversions and increased catalyst deactivation rates which result. However, countercurrent vaporized oil flow, though hard to accomplish with heavy oils, would be desirable. The benefits of this moving bed system include longer process runs between shutdowns, dictated only by mechanical problems or periodic maintenance, the elimination of pressure drop buildup, a more consistent product and the ability to remove contaminants to a lower level with an equal amount of catalyst.

The invention comprises using regenerated catalyst in a first moving bed reactor which is of small volume and serves as a guard reactor for the main moving bed hydrotreating reactor of the process which uses fresh catalyst. For this discussion, a moving bed reactor is defined as a reactor wherein a non-fluidized bed of catalysts is slowly transferred from one end of the reactor to the other end, in flow similar to plug flow of reactants, by the addition of catalyst at the first end and removal at the second. New catalyst is charged to the top of the main, second, reactor and after a residence period determined by deactivation effects present in both reactors, is removed from the bottom of the reactor and regenerated. The regeneration process is meant to be the removal of built up layers of coke from the catalyst. Secondary optional steps associated with this regeneration are the reduction of the base metal atoms contained on the catalyst from an oxidized state resulting from the combustion necessary to remove carbon, and the sulfiding of these metal atoms to reduce the cracking tendency of the raw metals. Although cracking is often desired in the process, the raw metals have a near uncontrollable catalytic activity which results in poor processing results. The regenerated catalyst is then fed into the first reactor for use as the initial cracking catalyst and as a filter medium. Spent catalyst is withdrawn from the bottom of this first reaction zone and sent to a metals recovery unit or simply disposed of.

The deposition of carbon on the catalyst may cause deactivation at a higher rate than the fouling of the catalyst by the accumulation of metals removed from the charged material. In this situation, the economic factors, of process performance and catalyst cost may dictate that regeneration of used catalyst from the second reactor be performed at a rate greater than the total degradation rate in the first reactor. Some portions of the regenerated catalyst would therefore be returned to the second reactor rather than charged to the first reactor. This rate of catalyst return would be set by the relative deactivation rates and the desired average activity of the two beds of catalyst which are interrelated to such factors as utility expense, processing conditions, the average catalyst life, the catalyst turnover rate in the first reactor and the relative physical size of the two reactors. The complexity of these relationships makes it impossible in this discussion to describe an optimum catalyst turnover or recycle rate until constrained to a specific catalyst, charge stock, product specification, and reactor size.

The reverse of the above situation occurs when the rate of catalyst fouling by metals deposition is very severe compared to carbon build up. To maintain the desired catalyst activity in the first reactor, it may be necessary to charge fresh catalyst to both the first and second reactors.

Recycling of catalyst removed from the first reactor to the first reactor after regeneration may be appropriate in the special instances of the startup of the process with both reactors loaded with fresh catalyst or with very excessive coke build up in the first reactor.

The addition and removal of catalysts from the reaction zones is performed in a lock hopper type apparatus comprising an enclosed volume between two valves. In the addition step, catalyst from above is allowed to fall into the lock hopper, the top valve is closed, the pressure in the lock hopper is equalized with the reaction zone and the bottom valve is then opened. In this manner catalyst can be intermittently added to, and removed from, either reactor without upsetting the process due to changes in the pressure or temperature of the reaction zone.

A lock hopper type device may also be used as the regeneration zone between the two reactors. In operation, catalyst would enter the regeneration zone which would then be sealed off, entrained oil removed and an oxygen containing gas would be passed over the catalyst which due to its high temperature would spontaneously ignite and burn off hydrocarbon residue and coke layers. The temperature of the catalyst being regenerated should not be allowed to exceed 850° F. to 900° F. Undesirable flash flame effects and resulting high temperatures are avoided by the judicious use of nitrogen purges of the lock hopper before regeneration, and the dilution of the air used in the regeneration by nitrogen or recycled combustion gases. The oxygen concentration of the gas used to regenerate the catalyst is normally maintained below about 1 to 2%.

After the regeneration process, the metal contained on the catalyst is in a highly oxidized state. The catalyst can be fed directly into the first reactor at this point. It is desirable, however, to perform the reduction and sulfiding gradually at controlled conditions and rates which produce an increased catalytic activity over that obtained by the direct insertion of the catalyst into a reaction zone. The reduction can be performed by passing a gas such as hydrogen or methane over the catalyst at an elevated temperature to utilize the oxygen combined with metal in a combustion process. After this step, the catalyst would be contacted with a sulfur containing substance such as hydrogen sulfide or a sulfur containing light cycle oil. U.S. Pat. No. 3,642,613 presents an improved method for reduction and sulfiding of fresh catalyst with an initial prewetting with a light cycle oil for an extended period of about 18 hours while at a moderate temperature of about 300° F., a pressure of 2000 p.s.i.g. and a hydrogen circulation rate of 5000 s.c.f./bbl. Following this, the temperature is raised to 450° F. for a period of about 32 hours or until an equilibrium concentration of $H_2S$ is formed. The charge stock is then cut into the process, the light cycle oil circulation is discontinued and the reactor is raised to the temperature necessary to perform the desired hydro-treating. In the present invention, the charge stock would of course not be contacted with the catalyst until it had been transferred to the reaction zone. The method of sulfiding chosen is dependent on the increase in activity derived compared to the increased costs and the comparative rates of deactivation due to metals and coke disposition.

We claim as our invention:

1. A process for the catalytic hydroprocessing of hydrocarbons containing metal, sulfur and nitrogen impurities therein, said process having at least two moving bed reactors operated with series hydrocarbon flow, which comprises the steps of:
   (a) passing a hydrocarbon charge stock and hydrogen through a first moving bed reaction zone to contact regenerated catalyst hereinafter described, said catalyst flowing downward in said first reaction zone to remove metal impurities from said charge stock;
   (b) passing the total reaction effluent from the first reaction zone to the top of a second moving bed reaction zone to contact therein fresh catalyst flowing downward in said second reaction zone to remove sulfur and nitrogen impurities from said effluent;
   (c) removing used catalyst from the bottom of said second reaction zone;
   (d) contacting said used catalyst with an oxygen-containing gas in a regeneration zone to burn off accumulated carbon deposits to form regenerated catalyst;
   (e) passing regenerated catalyst formed in step (d) into said first reaction zone as said regenerated catalyst of step (a), and
   (f) withdrawing spent catalyst from the bottom of said first reaction zone.

2. Process of claim 1 wherein the charge stock has an initial boiling point greater than 400° F.

3. Process of claim 1 wherein the charge stock contains on a weight basis at least 200 p.p.m. sulfur and 200 p.p.m. nitrogen.

4. The process of claim 1 wherein the charge stock comprises material having a boiling point range of 200° F. to 500° F.

5. The process of claim 1 wherein the charge stock has a metal content greater than 150 p.p.m. on a weight basis.

6. The process of claim 1 wherein the reactors are maintained at a temperature of from 500° F. to 850° F.

7. The process of claim 1 wherein the reactors are maintained at a pressure of from 200 to 500 pounds per square inch.

8. The process of claim 1 wherein the reactors are maintained at a pressure of from 500 to 1000 pounds per square inch.

9. The process of claim 1 wherein the reactors are maintained at a pressure of from 1000 to 4000 pounds per square inch.

10. The process of claim 1 wherein the catalyst comprises a metal selected from the group consisting of nickel, iron, cobalt and vanadium supported on an inorganic oxide base.

11. The process of claim 1 wherein the catalyst regeneration is performed in a holding zone to form a stationary bed of said catalyst.

12. The process of claim 1 wherein the catalyst regeneration is performed in a zone having a moving bed of said catalyst.

13. The process of claim 1 wherein the catalyst regeneration is performed in a zone having a fluidized bed of said catalyst.

14. The process of claim 1 wherein said catalyst withdrawn from the first reaction zone is regenerated and returned to said first reaction zone.

15. A process for the catalytic hydroprocessing of hydrocarbons containing metal, sulfur and nitrogen impurities therein, said process using at least two moving bed reactors operated in series hydrocarbon flow, which comprises the steps of:
  (a) passing a hydrocarbon charge stock and hydrogen through a first moving bed reaction zone to contact regenerated catalyst hereinafter described, said catalyst flowing downward in said first reaction zone to remove metal impurities from said charge stock;
  (b) passing the total reaction effluent from the first reaction zone to the top of a second moving bed reaction zone to contact therein a mixture of fresh and regenerated catalyst flowing downward in said second reaction zone to remove sulfur and nitrogen impurities from said effluent;
  (c) removing used catalyst from the bottom of said second reaction zone;
  (d) contacting said used catalyst with an oxygen-containing gas to burn off accumulated carbon deposits to form regenerated catalyst in a regeneration zone;
  (e) passing a portion of said regenerated catalyst formed in step (d) into said first reaction zone as said regenerated catalyst of step (a);
  (f) passing a portion of said regenerated catalyst formed in step (d) into said second reaction zone, and
  (g) withdrawing spent catalyst from the bottom of said first reaction zone.

16. Process of claim 15 wherein the charge stock has an initial boiling point greater than 400° F.

17. Process of claim 15 wherein the charge stock contains on a weight basis at least 200 p.p.m. sulfur and 200 p.p.m. nitrogen.

18. The process of claim 15 wherein the charge stock comprises material having a boiling point range of 200° F. to 500° F.

19. The process of claim 15 wherein the charge stock has a metal content greater than 150 p.p.m. on a weight basis.

20. The process of claim 15 wherein the reactors are maintained at a temperature of from 500° F. to 850° F.

21. The process of claim 15 wherein the reactors are maintained at a pressure of from 200 to 500 pounds per square inch.

22. The process of claim 15 wherein the reactors are maintained at a pressure of from 500 to 1000 pounds per square inch.

23. The process of claim 15 wherein the reactors are maintained at a pressure of from 1000 to 4000 pounds per square inch.

24. The process of claim 15 wherein the catalyst comprises a metal selected from the group consisting of nickel, iron, cobalt and vanadium supported on an inorganic oxide base.

25. The process of claim 15 wherein the catalyst regeneration is performed in a holding zone to form a stationary bed of said catalyst.

26. The process of claim 15 wherein the catalyst regeneration is performed in a zone having a moving bed of said catalyst.

27. The process of claim 15 wherein the catalyst regeneration is performed in a zone having a fluidized bed of said catalyst.

References Cited
UNITED STATES PATENTS

| | | | |
|---|---|---|---|
| 2,717,860 | 9/1955 | Rex | 208—216 |
| 2,909,476 | 10/1959 | Hemminger | 208—213 |
| 3,607,725 | 9/1971 | Irvine et al. | 208—89 |
| 3,679,574 | 7/1972 | Irvine | 208—89 |
| 3,686,093 | 8/1972 | Irvine | 208—89 |

DELBERT E. GANTZ, Primary Examiner

G. J. CRASANAKIS, Assistant Examiner

U.S. Cl. X.R.

208—251 H